United States Patent
Pendar

(10) Patent No.: US 10,853,401 B2
(45) Date of Patent: *Dec. 1, 2020

(54) METHOD, APPARATUS, AND COMPUTER PROGRAM PRODUCT FOR CLASSIFICATION AND TAGGING OF TEXTUAL DATA

(71) Applicant: Groupon, Inc., Chicago, IL (US)

(72) Inventor: Nick Pendar, San Ramon, CA (US)

(73) Assignee: GROUPON, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/511,045

(22) Filed: Jul. 15, 2019

(65) Prior Publication Data

US 2020/0050617 A1 Feb. 13, 2020

Related U.S. Application Data

(63) Continuation of application No. 15/051,051, filed on Feb. 23, 2016, now Pat. No. 10,387,470, which is a continuation of application No. 13/893,044, filed on May 13, 2013, now Pat. No. 9,330,167.

(51) Int. Cl.
| | |
|---|---|
| *G06F 16/30* | (2019.01) |
| *G06F 16/35* | (2019.01) |
| *G06F 16/93* | (2019.01) |
| *G06F 16/31* | (2019.01) |
| *G06F 16/338* | (2019.01) |

(52) U.S. Cl.
CPC ............ *G06F 16/35* (2019.01); *G06F 16/328* (2019.01); *G06F 16/338* (2019.01); *G06F 16/93* (2019.01)

(58) Field of Classification Search
CPC ............................... G06F 16/338; G06F 16/35
See application file for complete search history.

(56) References Cited

U.S. PATENT DOCUMENTS

| | | | |
|---|---|---|---|
| 6,697,998 B1 | 2/2004 | Damerau et al. | |
| 8,019,763 B2 | 9/2011 | Wang et al. | |
| 8,873,867 B1 * | 10/2014 | Alldrin | G06F 16/583 382/224 |
| 2003/0221163 A1 | 11/2003 | Glover et al. | |

(Continued)

OTHER PUBLICATIONS

Notice of Allowance for corresponding U.S. Appl. No. 13/893,044 dated Jan. 5, 2016.

*Primary Examiner* — Mahesh H Dwivedi
(74) *Attorney, Agent, or Firm* — Alston & Bird LLP

(57) ABSTRACT

Provided herein are systems, methods and computer readable media for classification and tagging of textual data. An example method may include accessing a corpus comprising a plurality of documents, each document having one or more labels indicative of services offered by a merchant, generating a query based on extracted features and the documents, generating a precision score for at least a portion of the generated query and selecting a subset of the generated queries based on an assigned precision score satisfying a precision score threshold, the selected subset of the generated queries configured to provide an indication of one or more labels to be applied to machine readable text. A second example method, utilized for tagging machine readable text with unknown labels, may include assigning a label to textual portions of the machine readable text based on results of the application of the queries.

21 Claims, 7 Drawing Sheets

(56) References Cited

U.S. PATENT DOCUMENTS

| | | |
|---|---|---|
| 2004/0064464 A1 | 4/2004 | Forman et al. |
| 2005/0210065 A1 | 9/2005 | Nigam et al. |
| 2008/0147575 A1 | 6/2008 | Roy |
| 2008/0281764 A1 | 11/2008 | Baxter |
| 2009/0171956 A1 | 7/2009 | Gupta et al. |
| 2009/0327260 A1 | 12/2009 | Li et al. |
| 2010/0030768 A1 | 2/2010 | Poblete et al. |
| 2010/0153318 A1* | 6/2010 | Branavan ............ G06F 16/35 706/12 |
| 2011/0106732 A1 | 5/2011 | Chidlovskii |
| 2011/0137904 A1 | 6/2011 | Rajaram et al. |
| 2011/0191319 A1* | 8/2011 | Nie .................. G06F 16/3338 707/706 |
| 2014/0040275 A1* | 2/2014 | Dang ................ G06F 16/2228 707/741 |
| 2014/0067815 A1 | 3/2014 | Sun et al. |
| 2015/0310099 A1* | 10/2015 | Convertino .......... G06F 16/353 707/739 |
| 2017/0060993 A1* | 3/2017 | Pendar ................ G06F 16/35 |
| 2017/0185670 A1* | 6/2017 | Dua ................ G06F 16/5866 |

* cited by examiner

METHOD, APPARATUS, AND COMPUTER PROGRAM PRODUCT FOR CLASSIFICATION AND TAGGING OF TEXTUAL DATA

CROSS-REFERENCE TO RELATED APPLICATION

This application is a continuation of and claims priority to U.S. patent application Ser. No. 15/051,051 filed Feb. 23, 2016, which is a continuation of U.S. application Ser. No. 13/893,044, filed May 13, 2013, now U.S. Pat. No. 9,330,167, the entirety of which is hereby incorporated by reference.

FIELD

Embodiments of the invention relate, generally, to classification and tagging of textual data with automatically learned queries.

BACKGROUND

Applicant has discovered problems with current methods for classification and tagging of textual data. In some examples, a plurality of manual steps in the classification and tagging of the textual data may be improved. Through applied effort, ingenuity, and innovation, Applicant has solved many of these identified problems by developing a solution that is embodied by the present invention, which is described in detail below.

BRIEF SUMMARY

In general, embodiments of the present invention provided herein include systems, methods and computer readable media for the classification and tagging of textual data with automatically learned queries.

In one embodiment of the present invention, a method is provided for identifying one or more services based on machine readable text comprising accessing a corpus comprising a plurality of documents, each of one or more documents of the corpus having one or more labels indicative of one or more services offered by a merchant, generating, using a processor, at least one query based on one or more extracted features and the one or more documents, generating a precision score for at least a portion of the generated at least one query, and selecting a subset of the generated at least one query based on an assigned precision score satisfying a precision score threshold, wherein the selected subset of the generated at least one query are configured to provide an indication of one or more labels to be applied to machine readable text.

In one embodiment, the precision score is calculated based on the number of true positive documents returned by the query divided by the total number of documents returned. In one embodiment, generating the query further comprises generating an array of feature index pairs, the array of feature index pairs comprising one or more features and a position of the one or more features in a sentence, generating the at least one query as a function of one or more combinations of feature index pairs based on the array, and outputting the at least one query. In one embodiment, generating the query further comprises calculating a distance between a first feature in a query and a second feature in the query, and generating a distance measure for the query.

In one embodiment, the method may further comprise rounding the distance between the two keywords to a next highest multiple of a predetermined number. In one embodiment, the method further comprising receiving the corpus, causing a first subset of words to be ignored in the corpus, the subset of words comprising at least one of rare words or stop words, scoring a second subset of words based on the relationship between a word of the second subset of keywords and a label, and extracting features, the features comprising one or more words from the second subset of keywords that satisfy a predetermined threshold.

In one embodiment, the method may further calculating a normalization factor based on the precision score. In one embodiment, the method may further comprise accessing machine readable text, applying the subset of the generated at least one query, generating a score for the machine readable text, the score is a function of the precision score of a query of the subset of the generated at least one query divided by a normalization factor, and generating at least one label for the machine readable text. In one embodiment, the at least one label is a sub-dominant level in a hierarchical structure of service categories.

In one embodiment of the present invention, a method is provided for tagging machine readable text recovered from one or more electronic sources comprising accessing the machine readable text, applying one or more queries to the machine readable text, wherein the one or more queries are automatically generated from a corpus having one or more documents with one or more labels that indicative of one or more services offered by a merchant based on an extracted feature set and a precision score, each of the queries having an associated weight, assigning, using a processor, a label to textual portions of the machine readable text based on results of the application of the queries to the machine readable text, and classifying a merchant based on the label.

In one embodiment, each query comprises a score indicative of an ability to return relevant results, and the method may further comprise accessing the corpus comprising a plurality of documents, each of one or more documents of the corpus having one or more labels indicative of one or more services offered by a merchant, generating at least one query based on one or more extracted features and the one or more documents, generating a precision score for at least a portion of the generated at least one query, and selecting one or more queries from the generated at least one query based on an assigned precision score satisfying a precision score threshold, wherein the selected subset of the generated at least one query are configured to provide an indication of one or more labels to be applied to machine readable text.

In one embodiment, the precision score is calculated based on the number of true positive documents returned by the query divided by the total number of documents returned. In one embodiment, generating the query further comprises generating an array of feature index pairs, the array of feature index pairs comprising one or more features and a position of the one or more features in a sentence, generating that at least one query as a function of one or more combinations of feature index pairs based on the array, and outputting the at least one query. In one embodiment, generating the query further comprises calculating a distance between a first feature in a query and a second feature in the query, and generating a distance measure for the query.

In one embodiment, the method may further comprise rounding the distance between the two keywords to a next highest multiple of a predetermined number. In one embodiment, the method may further comprise receiving the corpus, causing a first subset of words to be ignored in the corpus, the subset of words comprising at least one of rare words or stop words, scoring a second subset of words based on the relationship between a word of the second subset of keywords and a label, extracting features, the features comprising one or more words from the second subset of keywords that satisfy a predetermined threshold. In one embodiment, the method may further comprise calculating a normalization factor based on the precision score. In one embodiment, assigning a label to textual portions of the machine readable text based on results of the application of the queries to the machine readable text further comprises generating a score for the machine readable text, the score is a function of the precision score of a query of the subset of the generated at least one query divided by a normalization factor, and generating at least one label for the machine readable text. In one embodiment, the at least one label is a sub-dominant level in a hierarchical structure of service categories.

In one embodiment of the present invention, an apparatus for identifying one or more services based on machine readable text is provided, comprising at least one processor and at least one memory including computer program code, the at least one memory and the computer program code configured to, with the processor, cause the apparatus to at least access a corpus comprising a plurality of documents, each of one or more documents of the corpus having one or more labels indicative of one or more services offered by a merchant, generate, using a processor, at least one query based on one or more extracted features and the one or more documents, generate a precision score for at least a portion of the generated at least one query, and select a subset of the generated at least one query based on an assigned precision score satisfying a precision score threshold, wherein the selected subset of the generated at least one query are configured to provide an indication of one or more labels to be applied to machine readable text.

In one embodiment, the precision score is calculated based on the number of true positive documents returned by the query divided by the total number of documents returned. In one embodiment, generating the query further comprises generating an array of feature index pairs, the array of feature index pairs comprising one or more features and a position of the one or more features in a sentence, generating the at least one query as a function of one or more combinations of feature index pairs based on the array, and outputting the at least one query.

In one embodiment, generating the query further comprises calculating a distance between a first feature in a query and a second feature in the query, and generating a distance measure for the query. In one embodiment, the at least one memory and the computer program code are further configured to, with the processor, cause the apparatus to round the distance between the two keywords to a next highest multiple of a predetermined number. In one embodiment, the at least one memory and the computer program code are further configured to, with the processor, cause the apparatus to receive the corpus, cause a first subset of words to be ignored in the corpus, the subset of words comprising at least one of rare words or stop words, score a second subset of words based on the relationship between a word of the second subset of keywords and a label, and extract features, the features comprising one or more words from the second subset of keywords that satisfy a predetermined threshold. In one embodiment, the at least one memory and the computer program code are further configured to, with the processor, cause the apparatus to calculate a normalization factor based on the precision score. In one embodiment, the at least one memory and the computer program code are further configured to, with the processor, cause the apparatus to access machine readable text, apply the subset of the generated at least one query, generate a score for the machine readable text, the score is a function of the precision score of a query of the subset of the generated at least one query divided by a normalization factor, and generate at least one label for the machine readable text. In one embodiment, the at least one label is a sub-dominant level in a hierarchical structure of service categories.

In one embodiment of the present invention, an apparatus for tagging machine readable text recovered from one or more electronic sources is provided comprising at least one processor and at least one memory including computer program code, the at least one memory and the computer program code configured to, with the processor, cause the apparatus to at least access the machine readable text, apply one or more queries to the machine readable text, wherein the one or more queries are automatically generated from a corpus having one or more documents with one or more labels that indicative of one or more services offered by a merchant based on an extracted feature set and a precision score, each of the queries having an associated weight, assign, using a processor, a label to textual portions of the machine readable text based on results of the application of the queries to the machine readable text, and classify a merchant based on the label.

In one embodiment, each query comprises a score indicative of an ability to return relevant results, wherein the at least one memory and the computer program code are further configured to, with the processor, cause the apparatus to access the corpus comprising a plurality of documents, each of one or more documents of the corpus having one or more labels indicative of one or more services offered by a merchant, generate at least one query based on one or more extracted features and the one or more documents, generate a precision score for at least a portion of the generated at least one query, and select one or more queries from the generated at least one query based on an assigned precision score satisfying a precision score threshold, wherein the selected subset of the generated at least one query are configured to provide an indication of one or more labels to be applied to machine readable text.

In one embodiment, the precision score is calculated based on the number of true positive documents returned by the query divided by the total number of documents returned. In one embodiment, generating the query further comprises generating an array of feature index pairs, the array of feature index pairs comprising one or more features and a position of the one or more features in a sentence, generating that at least one query as a function of one or more combinations of feature index pairs based on the array, and outputting the at least one query.

In one embodiment, generating the query further comprises calculating a distance between a first feature in a query and a second feature in the query, and generating a distance measure for the query. In one embodiment, the at least one memory and the computer program code are further configured to, with the processor, cause the apparatus to round the distance between the two keywords to a next highest multiple of a predetermined number. In one embodiment, the at least one memory and the computer program code are further configured to, with the processor, cause the apparatus to receive the corpus, cause a first subset of words to be ignored in the corpus, the subset of words comprising at least one of rare words or stop words, score a second subset of words based on the relationship between a word of the second subset of keywords and a label, extract features, the features comprising one or more words from the second subset of keywords that satisfy a predetermined threshold.

In one embodiment, the at least one memory and the computer program code are further configured to, with the processor, cause the apparatus to calculate a normalization factor based on the precision score. In one embodiment, assigning a label to textual portions of the machine readable text based on results of the application of the queries to the machine readable text further comprises generating a score for the machine readable text, the score is a function of the precision score of a query of the subset of the generated at least one query divided by a normalization factor, and generating at least one label for the machine readable text. In one embodiment, the at least one label is a sub-dominant level in a hierarchical structure of service categories.

In one embodiment of the present invention, a computer program product for identifying one or more services based on machine readable text is provided comprising at least one non-transitory computer-readable storage medium having computer-executable program code portions stored therein, the computer-executable program code portions comprising program code instructions for accessing a corpus comprising a plurality of documents, each of one or more documents of the corpus having one or more labels indicative of one or more services offered by a merchant, generating, using a processor, at least one query based on one or more extracted features and the one or more documents, generating a precision score for at least a portion of the generated at least one query, and selecting a subset of the generated at least one query based on an assigned precision score satisfying a precision score threshold, wherein the selected subset of the generated at least one query are configured to provide an indication of one or more labels to be applied to machine readable text.

In one embodiment, the precision score is calculated based on the number of true positive documents returned by the query divided by the total number of documents returned. In one embodiment, generating the query further comprises generating an array of feature index pairs, the array of feature index pairs comprising one or more features and a position of the one or more features in a sentence, generating the at least one query as a function of one or more combinations of feature index pairs based on the array, and outputting the at least one query. In one embodiment, generating the query further comprises calculating a distance between a first feature in a query and a second feature in the query, and generating a distance measure for the query.

In one embodiment, the computer-executable program code portions further comprise program code instructions for rounding the distance between the two keywords to a next highest multiple of a predetermined number. In one embodiment, the computer-executable program code portions further comprise program code instructions for receiving the corpus, causing a first subset of words to be ignored in the corpus, the subset of words comprising at least one of rare words or stop words, scoring a second subset of words based on the relationship between a word of the second subset of keywords and a label, and extracting features, the features comprising one or more words from the second subset of keywords that satisfy a predetermined threshold. In one embodiment, the computer-executable program code portions further comprise program code instructions for calculating a normalization factor based on the precision score.

In one embodiment, the computer-executable program code portions further comprise program code instructions for accessing machine readable text, applying the subset of the generated at least one query, generating a score for the machine readable text, the score is a function of the precision score of a query of the subset of the generated at least one query divided by a normalization factor, and generating at least one label for the machine readable text. In one embodiment, the at least one label is a sub-dominant level in a hierarchical structure of service categories.

In one embodiment of the present invention, a computer program product for tagging machine readable text recovered from one or more electronic sources is provided comprising at least one non-transitory computer-readable storage medium having computer-executable program code portions stored therein, the computer-executable program code portions comprising program code instructions for accessing the machine readable text, applying one or more queries to the machine readable text, wherein the one or more queries are automatically generated from a corpus having one or more documents with one or more labels that indicative of one or more services offered by a merchant based on an extracted feature set and a precision score, each of the queries having an associated weight, assigning, using a processor, a label to textual portions of the machine readable text based on results of the application of the queries to the machine readable text, and classifying a merchant based on the label.

In one embodiment, each query comprises a score indicative of an ability to return relevant results, wherein the computer-executable program code portions further comprise program code instructions for accessing the corpus comprising a plurality of documents, each of one or more documents of the corpus having one or more labels indicative of one or more services offered by a merchant, generating at least one query based on one or more extracted features and the one or more documents, generating a precision score for at least a portion of the generated at least one query, and selecting one or more queries from the generated at least one query based on an assigned precision score satisfying a precision score threshold, wherein the selected subset of the generated at least one query are configured to provide an indication of one or more labels to be applied to machine readable text.

In one embodiment, the precision score is calculated based on the number of true positive documents returned by the query divided by the total number of documents returned. In one embodiment, generating the query further comprises generating an array of feature index pairs, the array of feature index pairs comprising one or more features and a position of the one or more features in a sentence, generating that at least one query as a function of one or more combinations of feature index pairs based on the array, and outputting the at least one query. In one embodiment, generating the query further comprises calculating a distance between a first feature in a query and a second feature in the query, and generating a distance measure for the query.

In one embodiment, the computer-executable program code portions further comprise program code instructions for rounding the distance between the two keywords to a next highest multiple of a predetermined number. In one embodiment, the computer-executable program code portions further comprise program code instructions for receiving the corpus, causing a first subset of words to be ignored in the corpus, the subset of words comprising at least one of rare words or stop words, scoring a second subset of words based on the relationship between a word of the second subset of keywords and a label, extracting features, the features comprising one or more words from the second subset of keywords that satisfy a predetermined threshold. In one embodiment, the computer-executable program code portions further comprise program code instructions for calculating a normalization factor based on the precision score. In one embodiment, assigning a label to textual portions of the machine readable text based on results of the application of the queries to the machine readable text further comprises generating a score for the machine readable text, the score is a function of the precision score of a query of the subset of the generated at least one query divided by a normalization factor, and generating at least one label for the machine readable text. In one embodiment, the at least one label is a sub-dominant level in a hierarchical structure of service categories.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
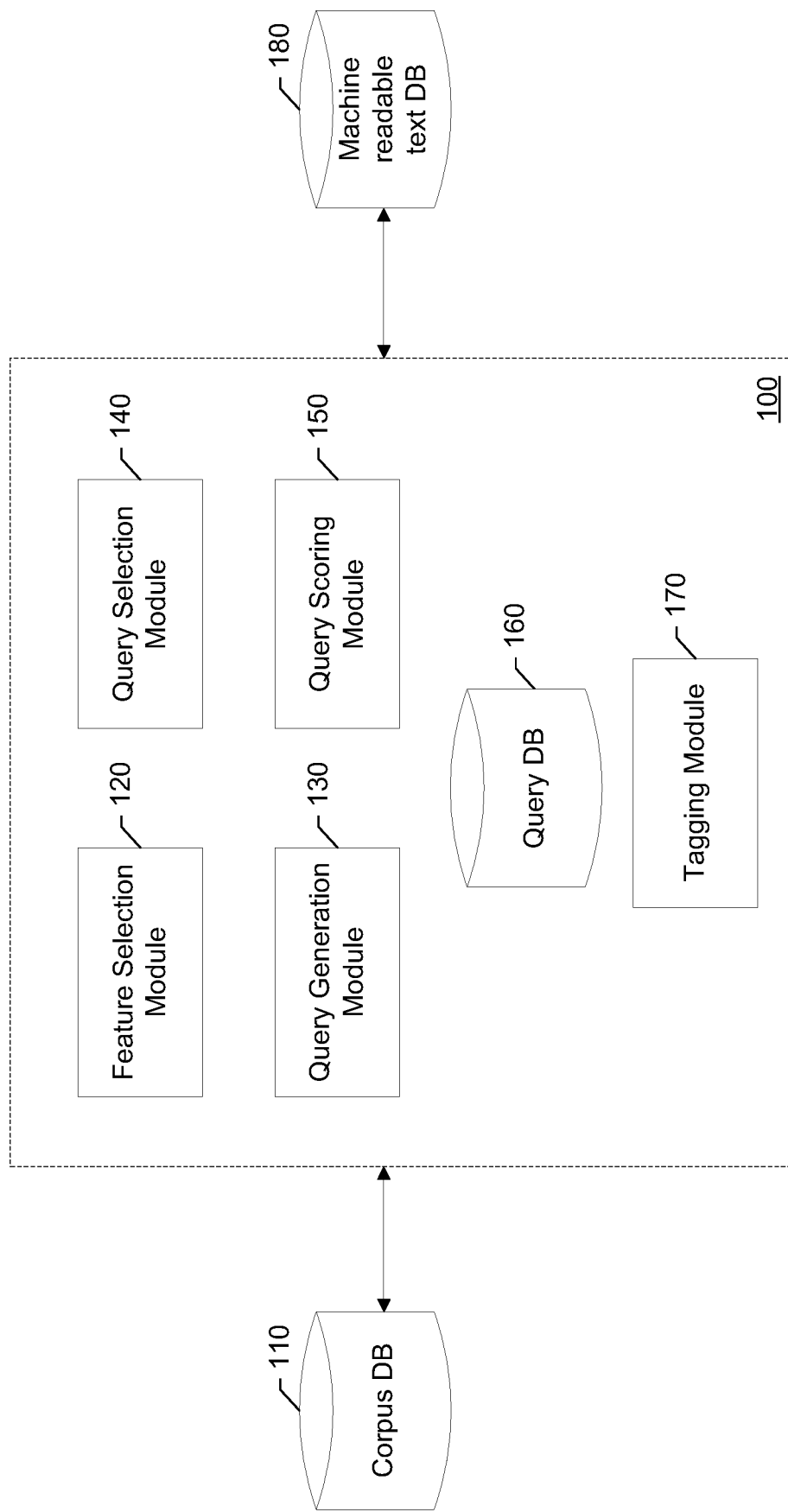
FIG. 1 is block diagram of a classification and tagging system that is configured to generate and score queries and classify and tag textual data, in accordance with an example embodiment.

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

Brief Overview

Methods, apparatus and computer program products described herein are operable for the classification and tagging of textual data using automatically learned or generated queries. For example, a training method, as described herein, may be configured to access a corpus that is comprised of annotated, labeled, tagged, or otherwise classified documents or textual portions to generate a set of features. In some examples, each document in the corpus may be assigned one or more labels and may be broken down into sentences so as to enable one or more queries to be generated based on the set of features. In some examples, a subset of the one or more queries may then be selected based on their ability to identify a label associated to a particular document.

Various embodiments of the invention are directed, in some examples, to the classification and tagging or otherwise labeling of merchants based on the services that the particular merchant offers. As such, based on a hierarchical service taxonomy, a corpus may be accessed that links text from the merchant, about the merchant or related to the merchant to a known service or services offered by that merchant. Based on the methods, apparatus and computer program products described herein, a set of queries may be automatically generated that provide the ability to identify services offered by other merchants, identify new services offered by existing merchants and/or the like.

Example System Architecture

FIG. 1 is a block diagram showing a system for use in the classification and tagging of textual data with automatically generated queries. Classification and tagging apparatus 100 may include a feature selection module 120, a query generation module 130, a query selection module 140, a query scoring module 150, a query database (DB) 160, a tagging module 170 and/or the like. In some examples, the feature selection module 120 may be configured to select a subset of keywords that may be deemed useful in a query for determining a particular label.

In some example embodiments, the feature selection module 120 is configured for accessing and/or receiving a corpus (e.g., a structured set of texts) from corpus database 110. The corpus may comprise one or more documents with an associated label such as category (e.g., food and drink) and/or service (e.g., pizza) taken from a defined service hierarchy or service taxonomy. Once the corpus is accessed, the feature selection module 120 may be configured for ignoring, extracting, modifying deleting or otherwise creating a new document without words that may not be indicative of a category or service offered by a service provider such as one or more of common words (e.g., a, an, and, for), rare words (e.g., words appearing only once), stop words, or the like. For example, if a document mapped to a particular service or having a specific label included the phrase "come enjoy our delicious sandwiches", the feature selection module 120 may remove "come" and "our". In some examples, common words, rare words, stop words or the like are simply ignored by the query generation model 130.

The feature selection module 120 may be further configured for calculating a score corresponding to a significance of a particular word within a service. The feature selection module 120 may utilize a known feature scoring method, such as binormal separation (BNS). For example, $F^{-1}(tpr)-F^{-1}(fpr)$, where F−1 is the standard Normal distribution's inverse cumulative probability function, tpr is true positive rate and fpr is the false positive rate. Other metrics may also be used for the feature selection, which include, but are not limited to F-measure, Information Gain, Chi Squared, Odds ratio, Document Frequency and/or the like.

The feature selection module 120 may further be configured for selecting or otherwise extracting a subset of words as features based on the scoring. In an example embodiment, the feature selection module may select any word meeting or otherwise satisfying a predetermined threshold. In another embodiment, a predetermined number of words are selected (e.g., the 1,000 words with the highest scores). For example, and based on the example above, "enjoy", "delicious" and "sandwich" may be scored and, providing they satisfy the predetermined threshold, may be extracted as features by feature selection module 120.

In some example embodiments, the query generation module 130 may be configured for generating one or more queries by iterating over the documents in the corpus based on the extracted features. In some example embodiments, a query that is generated by the query generation module 130 may comprise at least one feature, such as the word "pizza", at least two features such as the words "pizza" and "pepperoni", or three or more features.

In an instance in which a query contains two or more features, a distance between the two or more features may also be calculated. For example, the query generation module 130 may be configured to generate a list of queries including "enjoy", "delicious", "sandwiches", "enjoy"+"delicious" for each of one or more calculated distances, "enjoy"+"sandwiches" for each of one or more calculated distances, and "delicious"+sandwiches" for each of one or more calculated distances.

Subsequent to or during the generation of the set of queries, the query selection module 140 may be configured for applying each query generated by the query generation module for a particular category or service to each document in the corpus.

In some example embodiments, the query scoring module 150 may further be configured for calculating a precision score and/or a recall score each particular query. A precision score, in some examples, is a fraction of retrieved instances that are relevant (e.g., the number of true positives or the number of items correctly labeled as belonging to the positive class divided by the total number of elements labeled as belonging to the positive class or the sum of true positives and false positives, which are items incorrectly labeled as belonging to the class). A recall score, in some examples, is the fraction of relevant instances that are retrieved (e.g., the number of true positives divided by the total number of elements that actually belong to the positive class or the sum of true positives and false negatives, which are items which were not labeled as belonging to the positive class but should have been).

As such, the query selection module 140 may further be configured for selecting only those queries meeting a predefined threshold for precision and/or recall. For example, where a precision threshold is 90% or 95%, a query may be ignored or otherwise not selected when application of the query to the corpus returns 200 documents and 170 (e.g., 85%) are relevant.

In some example embodiments, the query scoring module 150 may also be configured to calculate a normalization factor that is configured, in some examples, to compute a score (e.g., between 0 and 1) to enable classification of new documents or machine readable text. In some examples, the normalization factor may take the form of the maximum non-outlier raw score possible based on the training set or corpus.

In some example embodiments, the query database 160 may be configured for storing one or more queries related to at least one target class, each query meeting or otherwise satisfying a threshold and having an associated score. In an example embodiment, query DB 160 may be configured for storing each of one or more queries, an associated label for each query and a score or weight for each query.

Classification and tagging apparatus 100 may additionally include tagging module 170. Tagging module 170 may be configured to utilize one or more queries, an associated label for each query to label one or more documents from a machine readable text database 180. The score associated with each of the queries may be utilized in an instance where each query is applied to a set of documents, for example from machine readable text, with unknown labels, recovered from electronic sources may be accessed for the purpose of labeling the included documents. The scores of each of the queries that return a positive document may be summed. The summed value may be used to determine a label for the document.

Classification and Tagging of Textual Data

FIGS. 2-6 illustrate example flowcharts of the example operations performed by a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other devices associated with execution of software including one or more computer program instructions.

Figure 7:
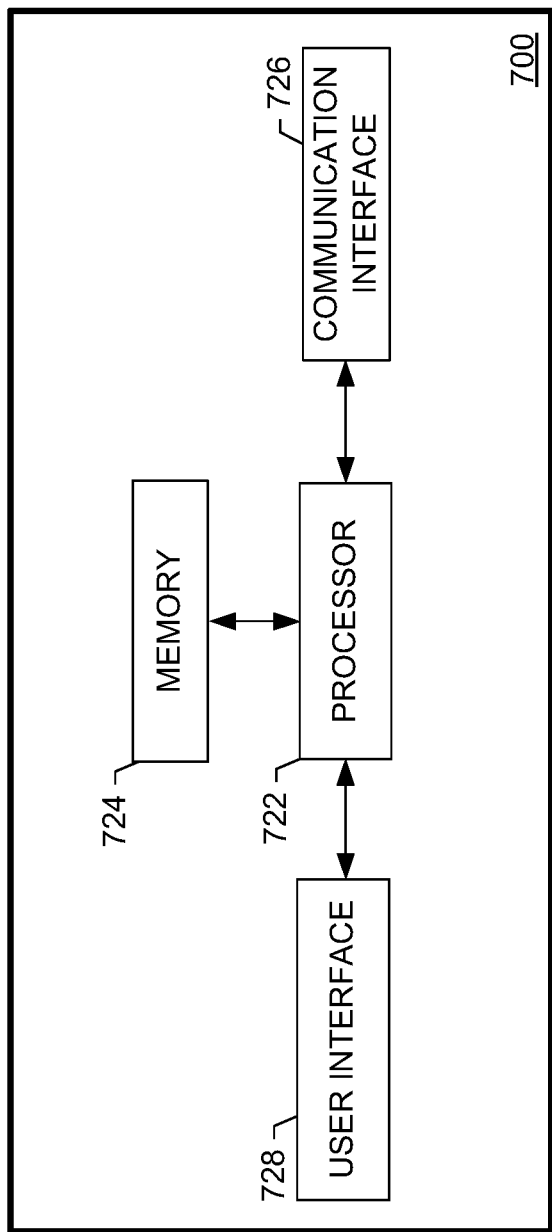
FIG. 7 is a block diagram of an apparatus that may be specifically configured in accordance with an example embodiment of the present invention.

For example, in reference to FIG. 7, one or more of the procedures described herein may be embodied by computer program instructions. In this regard, the computer program instructions which embody the procedures described above may be stored by a memory 724 of an apparatus employing an embodiment of the present invention and executed by a processor 722 in the apparatus.

As will be appreciated by one of ordinary skill in the art, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 2-6 when executed, convert a computer or processing circuitry into a particular machine configured to perform an example embodiment of the present invention. Accordingly, the operations of FIGS. 2-6 define an algorithm for configuring a computer or processing to perform an example embodiment. In some cases, a general purpose computer may be provided with an instance of the processor which performs the algorithms of FIGS. 2-6 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments, additional optional operations may also be included. It should be appreciated that each of the modifications, optional additions or amplifications below may be included with the operations above either alone or in combination with any others among the features described herein.

Service Identification Method

Figure 2:
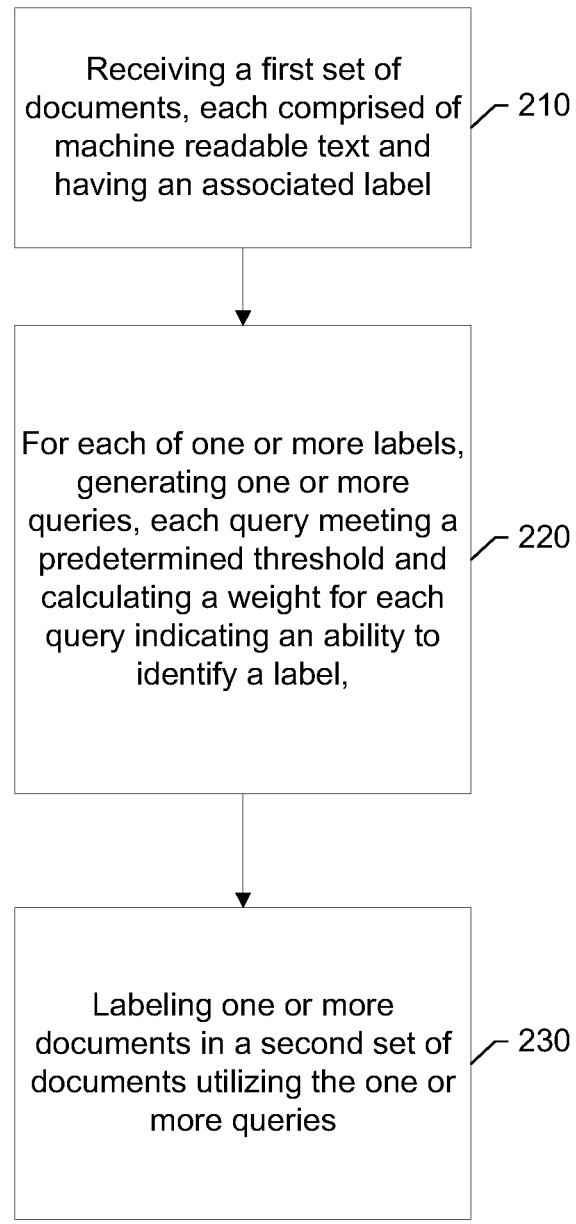
FIG. 2 is a flowchart illustrating a method for generating, selecting, and scoring queries and utilizing the queries to classify and tag textual data in accordance with an example embodiment.

FIG. 2 shows an example method that may be executed by one or more machines, for example by the classification and tagging apparatus 100 of FIG. 1, for generating, selecting, scoring queries and utilizing the queries to classify and tag textual data, in accordance with some embodiments discussed herein.

As shown in block 210 of FIG. 2, an apparatus, such as a classification and tagging apparatus 100, may be configured for accessing and/or receiving a corpus. One skilled in the art may appreciate that a corpus may include one or more portions of machine readable text. Here, each portion of machine readable text or each of the documents in the corpus may include a label identifying a category or service with which the portion or document is associated (e.g., "sushi"). In an example embodiment, the corpus may be accessed or received from a database. In yet another embodiment, the corpus may be downloaded from a memory (e.g., hard drive, thumb drive or the like) or otherwise accessed via a remote storage.

As shown in block 220 of FIG. 2, an apparatus, such as a classification and tagging apparatus 100, may be configured to, for each document or portion of the corpus, and for each of one or more labels, generate one or more queries. In some examples, the one or more queries are generated by analyzing each sentence or other grammatical unit within the corpus and, based on an extracted feature set, storing features or sets of features as queries. Once the queries (e.g., one or more features and a distance between the queries) are generated, the set of queries is reduced or otherwise pruned, in some examples, based on a generated precision score generated in an instance in which a particular query is applied to the corpus. Additional details regarding query set extraction as is shown in block 220 are shown at least with respect to FIG. 3.

As shown in block 230 of FIG. 2, an apparatus, such as a classification and tagging apparatus 100, may be configured for utilizing the one or more queries and labeling one or more documents from a second set of documents or portions from machine readable text recovered from electronic sources that may be accessed for the purpose of labeling the included documents.

Query Set Extraction Process

Figure 3:
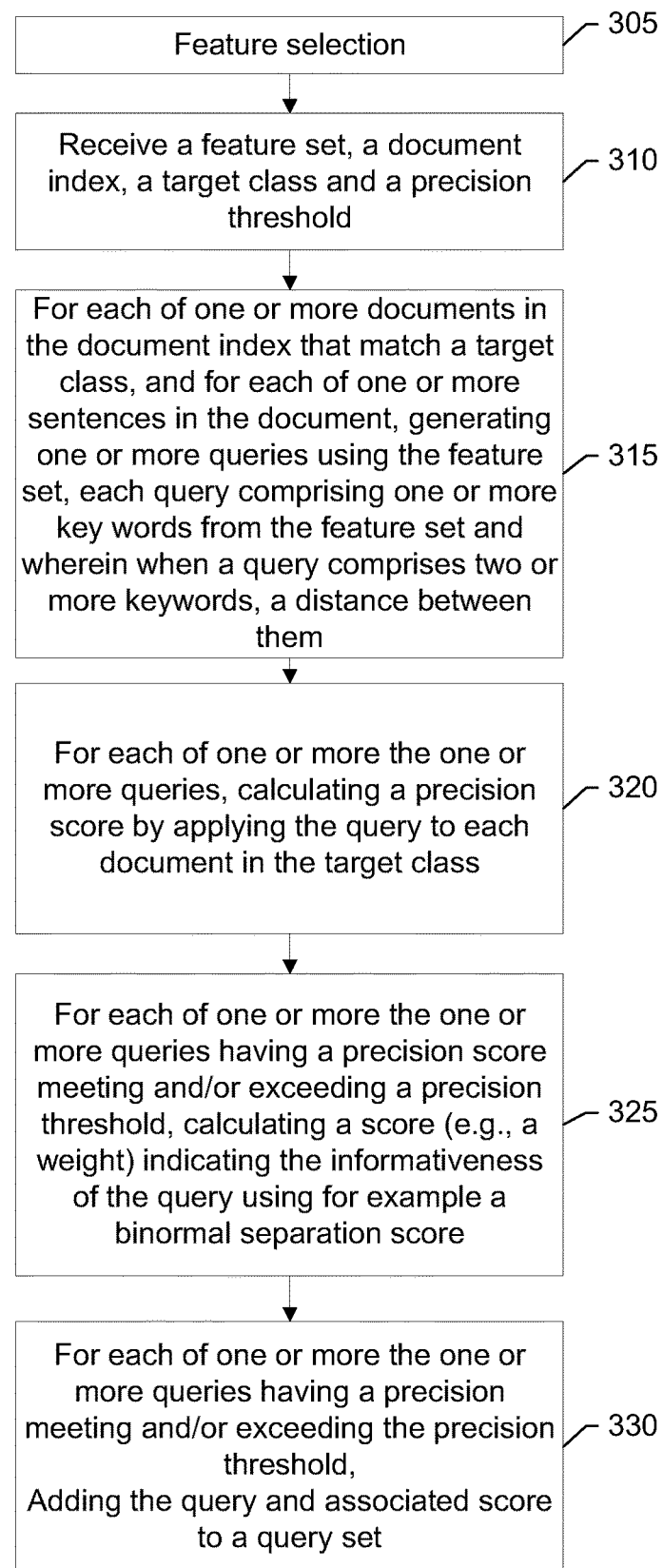
FIG. 3 is a flowchart illustrating a method for extracting a query set from a corpus in accordance with an example embodiment.

FIG. 3 shows an example method that may be executed by one or more machines (some examples of which are discussed in connection with FIGS. 1 and 5) to extract a query set from a corpus, in accordance with some embodiments discussed herein.

As shown in block 305 of FIG. 3, an apparatus, such as a classification and tagging apparatus 100, may be configured for feature selection. In order to perform feature selection and in an example embodiment, a corpus may be accessed and/or received. Using the accessed or received corpus, the classification and tagging apparatus 100 may be configured to select or otherwise identify a subset of keywords that may be eliminated, ignored or otherwise discarded, such as rare words, stop words and/or the like resulting in a subset of remaining words that may be suggestive of a particular service. For each word or a portion of the words in the subset of remaining words, a score may be calculated that is representative of a significance of the word with respect to a category (e.g., "food and drink" or "sushi") or service (e.g., Chinese-Dongbei, Chinese-Guangdong, Chinese-Halal, Chinese-Hotpot, Chinese-Seafood, Chinese-Shanghai, Chinese-Sichuan/Hunan or the like). As is described herein, a score for a particular word with respect to a particular label may be generated based on binormal separation, F-measure and/or the like. The classification and tagging apparatus 100 may then select the words with the highest scores to be extracted from the corpus as features. Alternatively or additionally, any word meeting a predefined threshold may also be selected.

As shown in block 310 of FIG. 3, an apparatus, such as a classification and tagging apparatus 100, may be configured for receiving a feature set, a document index, a target class and a precision threshold. In an example embodiment, the target class may be a label or tag, such as a service, for which a query is to be generated. The target class may be taken from a defined service hierarchy, service taxonomy or the like. The feature set may be a list of keywords identified by a feature selection step 205 as indicative or informative in identifying the target class. The document index may be each of one or more documents in the corpus. The precision threshold may be defined as the number of true positive documents (tpr) the query hits divided by the total number of documents it hits.

As shown in block 315 of FIG. 3, an apparatus, such as a classification and tagging apparatus 100, may be configured to, for each of the one or more documents in the document index that match a target class and for each of one or more sentences in the document, generate one or more queries using the feature set, each query comprising one or more keywords from the feature set. In an example embodiment, a query comprises two or more keywords and a distance between at least two of the keywords. The generation of queries is further discussed with reference to FIG. 4.

As shown in block 320 of FIG. 3, an apparatus, such as a classification and tagging apparatus 100, may be configured to, for each of the one or more generated queries, calculate a precision score by applying each of the queries to each document in the target class. Additionally or alternatively, a recall score may also be calculated in some example embodiments.

As shown in block 325 of FIG. 3, an apparatus, such as a classification and tagging apparatus 100, may be configured to, for each of one or more the one or more queries having a precision score that meets and/or exceeds a precision threshold, calculating a score (e.g., a weight) that is indicative of the informativeness of the query. For example, a first query may have a first precision rate and a first recall rate, and a second query may have a second precision rate and a second recall rate. For each of the queries meeting or exceeding a precision threshold, the score may be calculated and the respective precision and/or recall rate may be factored into the calculation of that score. In an example embodiment, a score for each may be calculated using for example a binormal separation (BNS) score. Each query that is selected for inclusion in the query set may have a BNS score. To identify a service for a document, all the queries in the query set associated with that service may be run on the document. The scores of the queries that hit that document may then be summed and result divided by the normalizing factor z to get a value between 0 and 1. If the resulting value passes a predetermined threshold, that service is assigned to the document.

In an example embodiment, the scores may be normalized. First, a normalization factor may be determined in order to calculate a normalized score for each query. For example and for each document the sum of the scores of the queries that hit that document may be computed:

$$raw\_score(d) = sum([query.score \text{ for query in query\_set if query hits } d])$$

$$raw\_scores \leftarrow [raw\_score(d) \text{ for all } d \text{ in training set}]$$

This example provides a distribution of raw scores for the documents in the corpus. This distribution may contain outliers and therefore, the normalization factor is calculated according to the following formula:

$$z = Q(3, raw\_scores) + 1.5 * IQR(raw\_scores)$$

where Q(3, raw_scores) may return the value at the third quartile of the document raw scores seen in the training data, and IQR(raw_scores) may return the inter-quartile range of the raw scores, thus effectively setting a normalization factor z to the maximum non-outlier raw score possible based on the training set.

As shown in block 330 of FIG. 3, an apparatus, such as apparatus 100, may be configured for, for each of one or more the one or more queries having a precision meeting and/or exceeding the precision threshold, adding the query and associated score to a query set. In an example embodiment, each query satisfying the precision score threshold, may be stored by target class.

Query Generation

Figure 4:
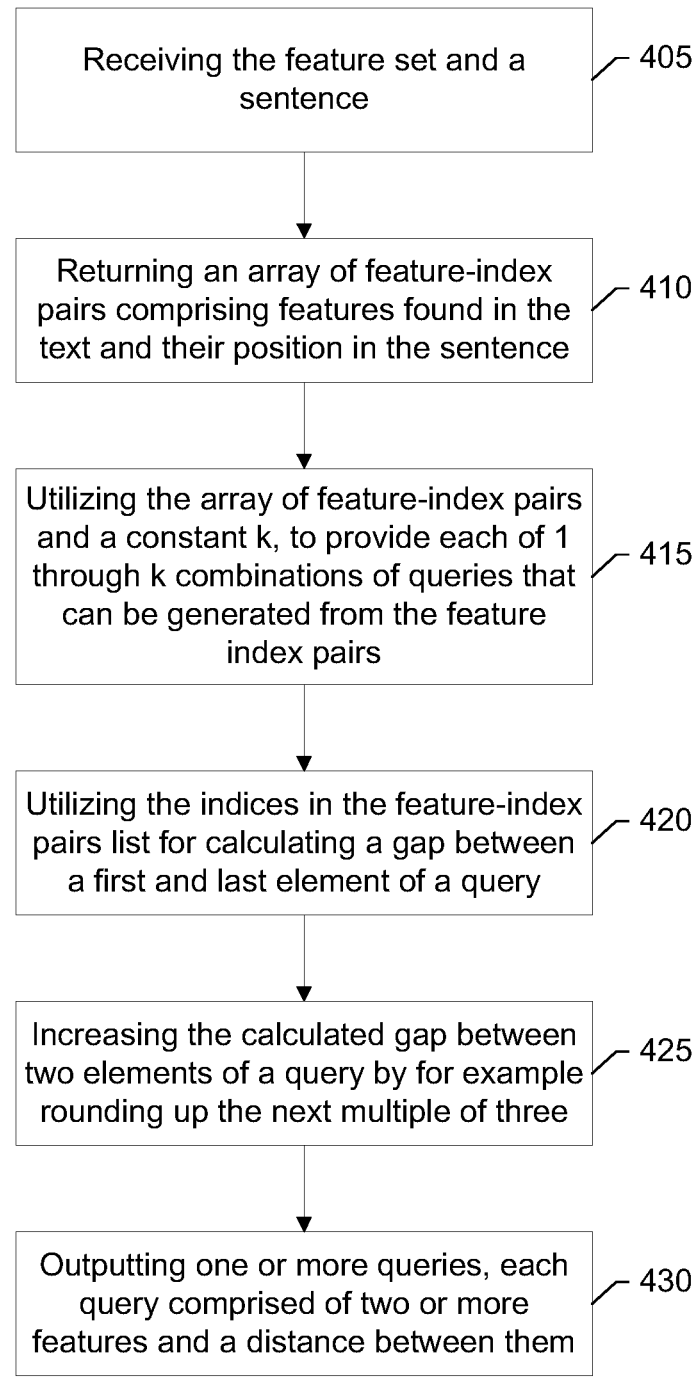
FIG. 4 is a flowchart illustrating a method for use in generating a query in accordance with an example embodiment.

FIG. 4 shows an example method that may be executed by one or more machines (some examples of which are discussed in connection with FIGS. 1 and 6) to generate queries, in accordance with some embodiments discussed herein.

As shown in block 405 of FIG. 4, an apparatus, such as a classification and tagging apparatus 100, may be configured for receiving the features set and a sentence. Although sentence is used here, one skilled in the art would appreciate that any portion of text or any grammatical unit may be utilized, such as for example a clause, a phrase, a line, a paragraph, a column or the like.

As shown in block 410 of FIG. 4, an apparatus, such as a classification and tagging apparatus 100, may be configured to, for each sentence parsed from a document in the corpus, return an array of feature-index pairs comprising features found in the text and their position in the sentence. For example, "sushi", "eat", "delicious" and or the like.

As shown in block 415 of FIG. 4, an apparatus, such as a classification and tagging apparatus 100, may be configured for utilizing the array of feature-index pairs to provide each query that may be generated from the feature-index pairs. In an example embodiment, a constant k may be provided and the feature-index pairs and the constant k may be utilized to provide each of 1 through k combinations of queries that can be generated from the feature-index pairs. For example, "sushi", "eat", "delicious", "eat"+"Sushi", "eat"+"delicious", "Sushi"+"delicious", "eat"+"sushi"+"delicious" and or the like.

As shown in block 420 of FIG. 4, an apparatus, such as a classification and tagging apparatus 100, may be configured for utilizing the indices in the feature-index pairs list for calculating a gap between a first and last feature of a query. In some examples, the gap may take the form of the distance in words between two or more features in an extracted sentence.

As shown in block 425 of FIG. 4, an apparatus, such as a classification and tagging apparatus 100, may be configured for increasing the calculated gap between a first and last element of a query. In an example embodiment, a calculated gap may be increased by rounding up to the next multiple of three (e.g., a calculated gap of 2 is increased to 3, and a calculated gap of 7 is increased to 9). Other such adjustments may be made in order to capture variability, such as but not limited to, ordering, spacing and/or the like.

As shown in block 430 of FIG. 4, an apparatus, such as a classification and tagging apparatus 100, may be configured for outputting one or more queries. In an example embodiment, each query may be comprised of two or more features and a distance between them. For example, ["delicious", "sushi", "3"].

Label Assignment

Figure 5:
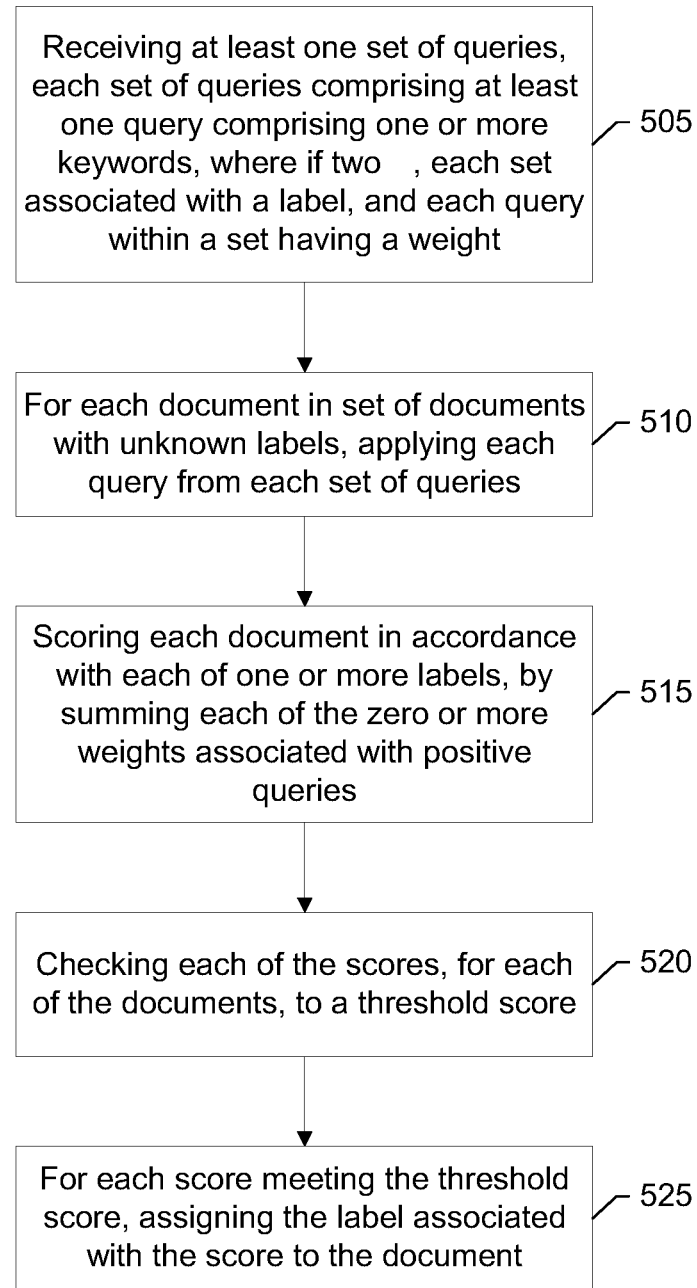
FIG. 5 is a flowchart illustrating a method for use in assigning labels to a corpus, in accordance with an example embodiment.

FIG. 5 shows an example method that may be executed by one or more machines (some examples of which are discussed in connection with FIGS. 1 and 5) to assign labels to a machine readable text in accordance with some embodiments discussed herein.

As shown in block 505 of FIG. 5, an apparatus, such as a classification and tagging apparatus 100, may be configured for receiving at least one set of queries, each set of queries comprising at least one query comprising one or more keywords. In an example embodiment, one or more queries may comprise two or more keywords and may provide a distance between at least two of the keywords. In an example embodiment, each set of queries associated with a label (e.g., a target class such as a service In an example embodiment).

As shown in block 510 of FIG. 5, an apparatus, such as a classification and tagging apparatus 100, may be configured to, for each document in a set of documents that may include machine readable text, with unknown labels, recovered from electronic sources that may be accessed for the purpose of labeling the included documents, apply each query from each set of queries. For example, each query from a set of queries with an associated label of a first service, a second service and an $n^{th}$ service may be applied.

As shown in block 515 of FIG. 5, an apparatus, such as a classification and tagging apparatus 100, may be configured for scoring each document in accordance with each of one or more labels. One method of scoring may include summing each of the zero or more weights associated with positive queries. For example, if a first service having a score of ".25" returns a positive result for a document, and four queries of a second service, having scores of ".4", ".5", ".6", and ".7" return positive results for the document, the document may be assigned a score of ".25" for the first service and "2.2" for the second service.

As shown in block 520 of FIG. 5, an apparatus, such as a classification and tagging apparatus 100, may be configured for checking each of the scores, for each of the documents, to a threshold score. For example, continuing from the previous paragraph where a document is found to have a ".25" score for the first service and a "2.2" score for the second service, each of the scores may be applied to a threshold, for example "2.0". Here, the second service may be assigned to the document because the 2.2 score exceeds a predetermined threshold of 2.0.

As shown in block 525 of FIG. 5, an apparatus, such as a classification and tagging apparatus 100, may be configured to, for each score meeting the threshold score, assign one or more labels associated with the score to the document. One method of scoring may include, but is not limited to: score(d)=raw_score(d)/z. For example, if a document retrieved from an electronic source has summed scores exceeding a predefined threshold for "pizza" and "spaghetti", each label may be associated with the document and thus associated with the particular merchant or service provider.

In one example embodiment, where the machine readable text is related to a webpage from an unknown service provider, the service provider may be stored with each of one or more labels corresponding to each of the labels assigned to one or more of the documents that are related to that service provider. For example, the machine readable text may include one or more documents crawled from a website, for example, http://MikeTheLocalServiceProvider-.com and two of the documents may part be an extensive menu, where one document focused on Italian cuisine while the other focused on desserts. The first document may be assigned labels such as "pizza" and "spaghetti" and the second may be assigned labels such as "dessert" and "coffee". As such, MikeTheLocalServiceProvider may be determined as providing "pizza", "spaghetti", "dessert" and "coffee" services. In some example embodiments, the website address or a service provider name alone may be suggestive of a particular label.

In one example embodiment, the method of FIG. 5 may be applied to machine readable text, with unknown labels, recovered from electronic sources comprised of one or more merchant names. The merchant names may be accessed from any source, such as a website listing local merchants, a phone book, a web search or the like.

Category Assignment

Figure 6:
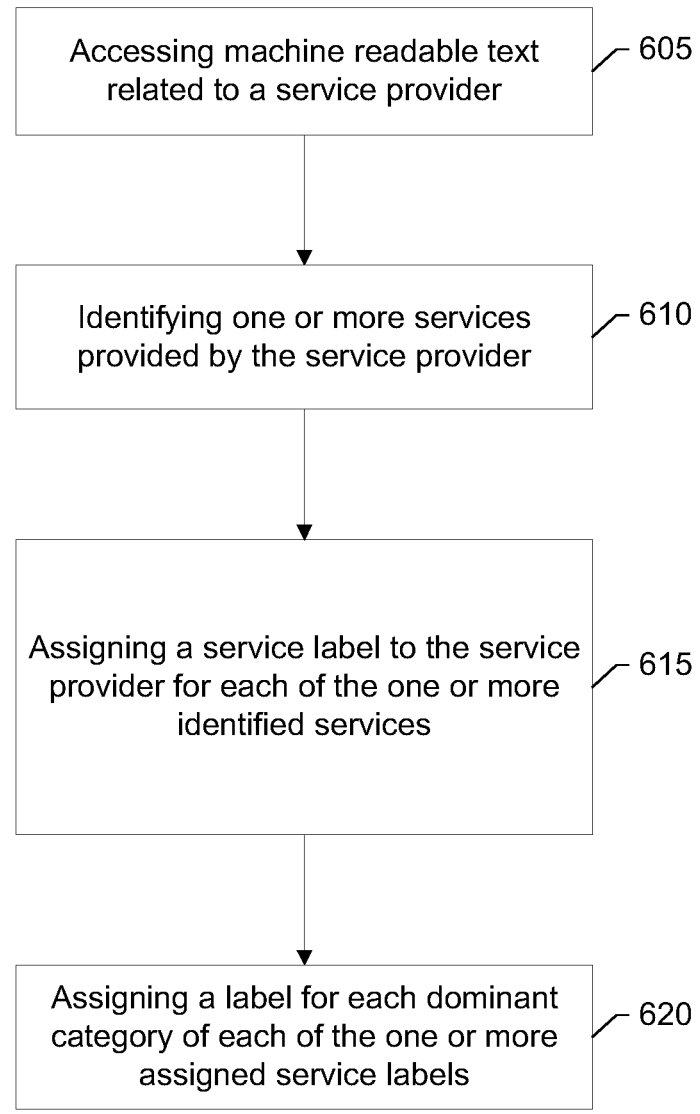
FIG. 6 is a flowchart illustrating a method for use in assigning labels and related categories to a corpus, in accordance with an example embodiment.

FIG. 6 shows an example method that may be executed by one or more machines (some examples of which are discussed in connection with FIGS. 1 and 7) to assign labels indicating a service and a related category to a machine readable text in accordance with some embodiments discussed herein.

As shown in block 605 of FIG. 6, an apparatus, such as a classification and tagging apparatus 100, may be configured for accessing machine readable text related to a service provider. For example, a name, one or more pages from a service provider website, an online menu, a review, an advertisement, a permit, a license and/or the like may be accessed.

As shown in block 610 of FIG. 6, an apparatus, such as a classification and tagging apparatus 100, may be configured for identifying one or more services provided by the service provider. In one embodiment, identification of services may be accomplished by the process shown in one or more of FIGS. 2, 3, 4, and 5. In one embodiment, identification may be performed by accessing the machine readable text and applying one or more queries to the machine readable text.

As shown in block 615 of FIG. 6, an apparatus, such as a classification and tagging apparatus 100, may be configured for assigning one or more labels to the service provider. As described herein, a label may be associated with a category or sub-category, such as for example, the label "burgers" may be associated with a category of "food and drink" from a service taxonomy. In another embodiment, one or more labels may be determined to be related to another label in the hierarchy. For example, the label "burgers" may be associated to "traditional American cuisine" and "meat". In another embodiment, a service taxonomy may provide a predefined hierarchical structure that includes at least 3 levels. In such cases, a label may be associated with one or more labels from a first category and the one or more labels from the first category are then associated to a label from a second category. For example, the label "lobster" may be associated to "seafood". "Seafood" may then be associated to "food and drink".

As shown in block 620 of FIG. 6, an apparatus, such as a classification and tagging apparatus 100, may be configured for assigning a label for each dominant category of each of the one or more assigned service labels. Continuing the example from the previous paragraph, in an instance in which a label "lobster" is determined, the label "lobster" may be assigned, a dominant label "seafood" may be assigned, and a dominant label "food and drink" may be assigned.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Computing Device Architecture

In some embodiments of the present invention, an apparatus, such as a classification and tagging apparatus 100, feature selection module 120, query generation module 130, query selection module 140, query scoring module 150 or tagging module 170 may be embodied by a computing device. The computing device may include or be associated with an apparatus 700 as shown in FIG. 7. In this regard, the apparatus may include or otherwise be in communication with a processor 722, a memory device 724, a communication interface 726 and a user interface 728. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 722 (and/or co-processors or any other processing circuitry assisting or otherwise associated with the processor) may be in communication with the memory device 724 via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus 700 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 700 may be embodied by the classification and tagging apparatus 100 configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 722 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 722 may be configured to execute instructions stored in the memory device 724 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a head mounted display)

configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In an example embodiment, the processor may also include user interface circuitry configured to control at least some functions of one or more elements of the user interface 728.

Meanwhile, the communication interface 726 may be any means such as a device or circuitry embodied in either hardware or a combination of hardware and software that is configured to receive and/or transmit data between apparatus 100 and databases 110 and/or 180. In this regard, the communication interface 726 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly with the head mounted displays 10, such as via Wi-Fi, Bluetooth or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the computing device.

The user interface 728 may be in communication with the processor 722, such as the user interface circuitry, to receive an indication of a user input and/or to provide an audible, visual, mechanical, or other output to a user. As such, the user interface may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. The user interface may also be in communication with the memory 724 and/or the communication interface 726, such as via a bus.

Many modifications and other embodiments of the inventions set forth herein will come to mind to one skilled in the art to which these embodiments of the invention pertain having the benefit of the teachings presented in the foregoing descriptions and the associated drawings. In some examples, the service hierarchy or service taxonomy that is trained may be used to define a service taxonomy for a local area of geographical area. In other words, the methods described herein may be used to define or otherwise instantiate a service hierarchy or service taxonomy for a geographical area. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for identifying one or more services based on machine readable text comprising:

accessing a corpus comprising a plurality of documents, each of one or more documents of the corpus having one or more labels indicative of one or more services offered by a merchant;

generating, using a processor, at least one query based on one or more extracted features and the one or more documents;

generating a precision score for at least a portion of the generated at least one query, wherein the precision score is calculated based on a number of true positive documents returned by the query divided by a total number of documents returned; and selecting a subset of the generated at least one query based on an assigned precision score satisfying a precision score threshold, wherein the selected subset of the generated at least one query are configured to provide an indication of one or more labels to be applied to machine readable text.

2. The method according to claim 1, wherein generating the query further comprises:

generating an array of feature index pairs, the array of feature index pairs comprising one or more features and a position of the one or more features in a sentence;

generating the at least one query as a function of one or more combinations of feature index pairs based on the array; and outputting the at least one query.

3. The method according to claim 1, wherein generating the query further comprises:

calculating a distance between a first feature in a query and a second feature in the query; and generating a distance measure for the query.

4. The method according to claim 1, further comprising:

receiving the corpus;

causing a first subset of words to be ignored in the corpus, the first subset of words comprising at least one of rare words or stop words;

scoring a second subset of words based on the relationship between a word of the second subset of words and a label; and extracting features, the features comprising one or more words from the second subset of words that satisfy a predetermined threshold.

5. The method according to claim 1, further comprising:

calculating a normalization factor based on the precision score.

6. The method according to claim 1, further comprising:

accessing machine readable text;

applying the subset of the generated at least one query;

generating a score for the machine readable text, the score is a function of the precision score of a query of the subset of the generated at least one query divided by a normalization factor; and generating at least one label for the machine readable text.

7. The method according to claim 6, wherein the at least one label is a sub-dominant level in a hierarchical structure of service categories.

8. An apparatus for identifying one or more services based on machine readable text, the apparatus comprising at least one processor and at least one memory including computer program code, the at least one memory and the computer program code configured to, with the processor, cause the apparatus to at least:

access a corpus comprising a plurality of documents, each of one or more documents of the corpus having one or more labels indicative of one or more services offered by a merchant;

generate, using the processor, at least one query based on one or more extracted features and the one or more documents;

generate a precision score for at least a portion of the generated at least one query, wherein the precision score is calculated based on a number of true positive documents returned by the query divided by a total number of documents returned; and select a subset of the generated at least one query based on an assigned precision score satisfying a precision score threshold, wherein the selected subset of the generated at least one query are configured to provide an indication of one or more labels to be applied to machine readable text.

9. The apparatus according to claim 8, wherein generating the query further comprises:

generating an array of feature index pairs, the array of feature index pairs comprising one or more features and a position of the one or more features in a sentence;

generating the at least one query as a function of one or more combinations of feature index pairs based on the array; and outputting the at least one query.

10. The apparatus according to claim 8, wherein generating the query further comprises:

calculating a distance between a first feature in a query and a second feature in the query; and generating a distance measure for the query.

11. The apparatus according to claim 8, wherein the at least one memory and the computer program code are further configured to, with the processor, cause the apparatus to:

receive the corpus;

cause a first subset of words to be ignored in the corpus, the first subset of words comprising at least one of rare words or stop words;

score a second subset of words based on the relationship between a word of the second subset of words and a label; and extract features, the features comprising one or more words from the second subset of words that satisfy a predetermined threshold.

12. The apparatus according to claim 8, wherein the at least one memory and the computer program code are further configured to, with the processor, cause the apparatus to:

calculate a normalization factor based on the precision score.

13. The apparatus according to claim 8, wherein the at least one memory and the computer program code are further configured to, with the processor, cause the apparatus to:

access machine readable text;

apply the subset of the generated at least one query;

generate a score for the machine readable text, the score is a function of the precision score of a query of the subset of the generated at least one query divided by a normalization factor; and generate at least one label for the machine readable text.

14. The apparatus according to claim 13, wherein the at least one label is a sub-dominant level in a hierarchical structure of service categories.

15. A computer program product for identifying one or more services based on machine readable text, the computer program product comprising at least one non-transitory computer-readable storage medium having computer-executable program code portions stored therein, the computer-executable program code portions comprising program code instructions for:

accessing a corpus comprising a plurality of documents, each of one or more documents of the corpus having one or more labels indicative of one or more services offered by a merchant;

generating, using a processor, at least one query based on one or more extracted features and the one or more documents;

generating a precision score for at least a portion of the generated at least one query, wherein the precision score is calculated based on a number of true positive documents returned by the query divided by a total number of documents returned; and selecting a subset of the generated at least one query based on an assigned precision score satisfying a precision score threshold, wherein the selected subset of the generated at least one query are configured to provide an indication of one or more labels to be applied to machine readable text.

16. The computer program product according to claim 15, wherein generating the query further comprises:

generating an array of feature index pairs, the array of feature index pairs comprising one or more features and a position of the one or more features in a sentence;

generating the at least one query as a function of one or more combinations of feature index pairs based on the array; and outputting the at least one query.

17. The computer program product according to claim 15, wherein generating the query further comprises:

calculating a distance between a first feature in a query and a second feature in the query; and generating a distance measure for the query.

18. The computer program product according to claim 15, wherein the computer-executable program code portions further comprise program code instructions for:

receiving the corpus;

causing a first subset of words to be ignored in the corpus, the first subset of words comprising at least one of rare words or stop words;

scoring a second subset of words based on the relationship between a word of the second subset of words and a label; and extracting features, the features comprising one or more words from the second subset of words that satisfy a predetermined threshold.

19. The computer program product according to claim 15, wherein the computer-executable program code portions further comprise program code instructions for:

calculating a normalization factor based on the precision score.

20. The computer program product according to claim 15, wherein the computer-executable program code portions further comprise program code instructions for:

accessing machine readable text;

applying the subset of the generated at least one query;

generating a score for the machine readable text, the score is a function of the precision score of a query of the subset of the generated at least one query divided by a normalization factor; and generating at least one label for the machine readable text.

21. The computer program product according to claim 15, wherein the at least one label is a sub-dominant level in a hierarchical structure of service categories.

* * * * *